(12) United States Patent
Preuschen et al.

(10) Patent No.: US 6,878,790 B2
(45) Date of Patent: Apr. 12, 2005

(54) HIGH MOLECULAR WEIGHT POLYOLEFIN AND CATALYST AND PROCESS FOR POLYMERIZING SAID POLYOLEFIN

(75) Inventors: Judith Preuschen, Mainz (DE); Bernhard Rieger, Oberelchingen (DE); Carsten Troll, Ulm (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 10/409,268

(22) Filed: Apr. 8, 2003

(65) Prior Publication Data

US 2003/0187158 A1 Oct. 2, 2003

Related U.S. Application Data

(63) Continuation of application No. PCT/US01/44949, filed on Nov. 30, 2001.

(30) Foreign Application Priority Data

Nov. 30, 2000 (EP) ............................................. 00126192
Jun. 18, 2001 (EP) ............................................. 01114578

(51) Int. Cl.$^7$ ............................................. C08F 110/06
(52) U.S. Cl. .................... 526/351; 526/348; 526/348.2; 526/348.3
(58) Field of Search ................................. 526/160, 165, 526/348, 351, 133, 134, 170, 159, 346

(56) References Cited

U.S. PATENT DOCUMENTS 4,522,982 A    6/1985  Ewen
5,747,621 A    5/1998  Resconi et al.

FOREIGN PATENT DOCUMENTS

WO    WO 92/05208    4/1992
WO    WO 99/52955    10/1999

OTHER PUBLICATIONS

Mansel S., et al., "Synthesis and Properties of Elastometric Poly(propylene)", Macromolecular Chemistry and Physics, Wiley–VCH Verlag GmbH, Weinheim, Germany, vol. 200, No. 6, Jun. 6, 1999, pp. 1292–1297.

*Primary Examiner*—Caixia Lu
(74) *Attorney, Agent, or Firm*—Julie A. McConihay; Angela Marie Stone

(57) ABSTRACT

The present invention relates to polyolefins and in particular to polyolefins comprising $C_3$–$C_{20}$ monomers and having a molecular weight of at least 700 kg/mol preferably 1000 kg/mol. The present invention further relates to a hafnium based metallocene catalyst and a process for making such polyolefins.

3 Claims, No Drawings

HIGH MOLECULAR WEIGHT POLYOLEFIN AND CATALYST AND PROCESS FOR POLYMERIZING SAID POLYOLEFIN

CROSS REFERENCE TO PRIOR APPLICATION

This is a continuation of International Application PCT/US01/44949, with an international filing date of Nov. 30, 2001, and published in English.

FIELD OF APPLICATION OF THE INVENTION

The present invention relates to polyolefins and in particular to polyolefins comprising $C_3$–$C_{20}$ monomers. The present invention further relates to a catalyst and a process for making such polyolefins.

BACKGROUND OF THE INVENTION

Polyolefinic materials are widely used in industry for a large variety of different applications. In particular their low cost and their versatility have led to polyolefins replacing conventional material from metal to rubber and have further led to polyolefins making entirely new applications accessible.

A great proportion of the specific material properties of polyolefins stems from the fact that such materials are not entirely crystalline but rather comprise crystallites of varying size. Many macroscopic properties can be linked to size of the crystallites more or less directly. One such property is the stress strain behaviour; the tensile forces required to strain the material need to be higher if the size of the crystallites become larger. Another macroscopic property linked to the size of the crystallites is the colour or transparency of the material. If the crystallite sizes are of the same size as the wavelength of visible light, the light is dispersed.

It is further known that an increase in molecular weight leads to: an increase in required tensile forces for straining the material; a higher melting temperature; improved compressive creep; improved hysteresis properties; and other changes. This is at least in part due to an increase of entangling between the molecules.

SUMMARY OF THE INVENTION

Hence, it is an object of the present invention to provide a polyolefin comprising $C_3$–$C_{20}$ monomers which overcomes the disadvantages of the prior polyolefins.

It is a further object of the present invention to provide a polyolefin comprising $C_3$–$C_{20}$ monomers and having high molecular weight.

Various polymerizing processes have been described in the art for polyolefins. Recently, the class of metallocene catalysts has attracted a lot of interest for their desirable polymerization catalysis characteristics.

Hence, it is an object of the present invention to provide a metallocene catalyst for polyolefin polymerization which overcomes the disadvantages of the prior art metallocene catalysts.

It is a further object of the present invention to provide a metallocene catalyst for polyolefin polymerization which enables polymerization of a polyolefin comprising $C_3$–$C_{20}$ monomers and which has a molecular weight of at least 700 kg/mol, and preferably at least 1000 kg/mol.

The present invention provides a polymeric material, preferably a stereohomopolymer, comprising substantially linear polyolefin molecules comprising $C_3$–$C_{20}$ monomers. The molecular weight of said linear polyolefin molecules is at least 700 kg/mol, preferably at least 1000 kg/mol.

The relative content of [mmmm] of said polyolefin is between 10% and 60% and said polymeric material has a ratio k of at least 0.05 where k is defined as $$k = \frac{[mrrm] - [m]^2(1-[m])^2}{[m](1-[m]) - [m]^2(1-[m])^2}$$

The present invention further provides a polymeric material wherein said monomer is propene.

The present invention further provides a catalyst combination for polymerising linear polyolefin molecules comprising $C_3$–$C_{20}$ monomers wherein said catalyst combination comprises a metallocene of the general formula

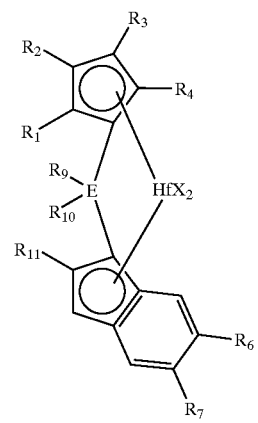

where
$R_1$ through $R_7$ refer to linear or branched $C_1$ to $C_{10}$ alkyl, 5- to 7-linked cycloalkyl which in its turn, can carry one ore several $C_1$ to $C_6$ alkyl residues as substituents, $C_6$ to $C_{18}$ arylalkyl or alkylaryl, in which case $R_1/R_2$, $R_3/R_4$, $R_6/R_7$ can be partially or simultaneously integrated into 5- to 7-linked cycloalkyl or aryl rings fused thereto
$R_9$ and $R_{10}$ refer to H, $C_1$ to $C_8$ alkyl, 4- to 7-linked cycloalkyl, aryl in which case $R_9$, $R_{10}$ can join with E to form a 4- to 7-linked cycloalkyl
X refers to a $C_1$ to $C_8$ alkyl, aryl, or benzyl, preferably methyl
E refers to carbon, silicon, germanium, or 1,2-ethyl, 1,3-propyl, or 1,4-butyl,
$E_2$ refers to methyl, oxygen or sulphur, and n is 1 or 2.

The present invention further provides a process for making polymeric material comprising substantially linear polyolefin molecules comprising $C_3$–$C_{20}$ monomers wherein said process comprises a step of polymerizing said monomers using the catalyst combination according to claim 6.

The present invention further provides a process for making a polymeric material comprising linear polyolefin molecules wherein the molecular weight of said linear polyolefin molecules is at least 700 kg/mol, preferably using bulk polymerization and in-situ activation; under such conditions, the use of the catalyst combination of the present invention, allows the catalysts herein to exhibit an activity of from 20,000 to 150,000 kg per mole of catalyst per hour (kg/mol cat/hour), preferably 40,000 to 120,000 kg/mol cat/hour.

DETAILED DESCRIPTION OF THE INVENTION

The present invention relates to substantially linear polyolefins comprising $C_3$–$C_{20}$ monomers. The presence of such monomers leads to the presence of stereo centres along the backbone. Two consecutive C atoms in the backbone either have a meso configuration (m dyad) or a rac configuration (r dyad) as is well known in the art. Such polymers having only m dyads are called isotactic, such polymers having only r dyads are syndiotactic. If the polymer comprises a random series of m and r dyads, it is called atactic. For the polymer of the present invention, the isotacticity is defined as the relative content of mmmm pentads, [mmmm]. In theory, [mmmm] can vary between 100% and $([m])^4$. The content of mmmm pentads, [mmmm], can be determined by $^{13}$C-NMR spectroscopy having a sufficiently high resolution to separate the individual pentads.

Preferably, the first monomer of the polymer of the present invention is a $C_3$–$C_{20}$ alk-1-ene, such as for example propene, 1-butene, 2-butene, 1-pentene, 1-hexene, 1-heptene, 1-octene, 1-nonene, 1-decene, 1-dodecene, 1-hexadecene, 1-octadecene, 1-eicosene, and the like. Alternatively, the first monomer may be a cycloolefin such as for example cyclopentene, cyclohexene, norbornadiene and its derivatives.

The polymer of the present invention may be a homopolymer or may be a copolymer of two or more different monomers. In order for the polymer of the present invention to have the above stereo characteristics at least the first monomer must be at least $C_3$. The second monomer and other additional monomers are preferably $C_3$–$C_{30}$ as defined above or may further be cycloolefins such as those specified above. Preferably, the polymer is a homopolymer comprising propene monomers, and is a polyolefinic stereohomopolymer.

The term "polyolefinic stereohomopolymer" as used herein refers to those polyolefins which a) comprise only one phase of molecules all of which exhibit a similar stereochemical configuration b) do not comprise blocks of differing stereochemical configuration For example, blends of atactic and isotactic polymers where the two phases have polymerized simultaneously are excluded when this term is used. Such mixtures of atactic and isotactic polypropylene are fractionable by dissolving in pentane yielding a pentane soluble fraction and a pentane insoluble fraction. The term stereohomopolymer includes copolymers where all molecules exhibit a similar stereochemical configuration. Furthermore, stereoblock polymers such as isotactic-atactic stereoblock polymers are excluded when this term is used.

The molecular weight of the polymer of the present invention is at least 700 kg/mol, preferably 1000 kg/mol, more preferably at least 1250 kg/mol, yet more preferably 1500 kg/mol, yet more preferably 1750 kg/mol, most preferably at least 2000 kg/mol. The molecular weight is determined for example by Gel Permeation Chromatography (GPC) with microstyragel as the column material, with 1,2,4-trichlorobenzole as solvent, and with the appropriate closely distributed calibration standards such as polyethylene, polystyrene, or the like.

For some applications, the molecular weight distribution $M_w/M_n$ of the polymer of the present invention, also measured by the above GPC method, is preferably less than 6, more preferably less than 5, yet more preferably less than 4, yet more preferably less than 2. Alternatively and for improved processability of the polymeric material of the present invention, it may be preferred for the material to have a broad molecular weight distribution. Preferably Mw/Mn is at least 5, more preferably at least 10, yet more preferably at least 15, yet more preferably at least 20, most preferably at least 30. Various techniques are known in the art such as blending different grades of material including reactor blends (the different grades may be produced in separate polymerisation reactions or in a single multistage polymerisation reaction), controlling the temperature during the polymerisation reaction such as through increasing the temperature, controlling the supply of the catalyst over time during the polymerisation reaction, choosing a specific type of catalyst system particularly including a mixture of two or more metallocene catalysts a mixture of metallocene catalysts and non-metallocene catalysts, using catalyst with more than one active site also in combination with other catalysts, using a second monomer, using a particular support material for the catalyst(s), using hydrogen during the polymerisation reaction, and the like.

The tacticity, i.e. the relative content of [mmmm] pentads, of the polymer of the present invention is at least 10.0%, preferably at least 15.0%, yet more preferably at least 20.0%, most preferably at least 22.5%. The tacticity of the polymer of the present invention is less than 60%, preferably less 50%, yet more preferably less than 40%, most preferably less than 35%.

Due to the specific stereo chemistry of the catalyst of the present invention, the polymeric material of the present invention preferably comprises a relatively high amount of mrrm pentads. This pentad is characteristic for a polymer side chain which exhibits a stereo chemistry opposite its two neighbouring polymer side chains. In particular in combination with additional neighbouring side chains which are also opposite to the central side chain, i.e. a mmrrmm heptad, the opposing central side chain is referred to as a single stereo error. For comparison, isotactic polymers and syndiotactic polymers are considered to have [mrrm]=0 and atactic polymers for statistical reasons have $[mrrm]=[m]^2[r]^2=[m]^2(1-[m])^2$. Preferably, the polymer of the present invention has a [mrrm] content substantially higher than an atactic polymer, i.e. a ratio k of at least 0.05, more preferably at least 0.1, yet more preferably at least 0.15, yet more preferably at least 0.2, yet more preferably at least 0.25, yet more preferably at least 0.3, yet more preferably at least 0.4 most preferably at least 0.5, where k is defined as $$k = \frac{[mrrm] - [m]^2(1-[m])^2}{[m](1-[m]) - [m]^2(1-[m])^2}$$

Preferably, the polymer of the present invention only has a low content of atactic sequences or rather regular sequences as can be seen from its low content of rmrm pentads. Preferably, for the polymer of the present invention [rmrm] is less than 7%, preferably less than 6.5%, more preferably less than 6% of the entire pentad range; in certain embodiments herein, [rmrm] can be less than 5%, more preferably less than 3%; in another embodiment herein, the level of [rmrm] is between 2.5% and 7% of the total pentad area.

The melting point of the polymer of the present invention is preferably at least 80° C., more preferably at least 100° C., more preferably at least 120° C., yet more preferably at least 130° C. The glass transition temperature of the polymer of the present invention is preferably below 30° C., more preferably below 10° C., yet more preferably below 0° C., most preferably below −5° C. High melting points and low glass transition temperatures ensure stability and usability of the polymeric material of the present invention over a wide range of temperatures. Melting point and glass transition temperature may be determined for example by Differential Scanning Calorimetry (DSC) methods that are well known in the art.

The polymer material of the present invention preferably has a low density of below 0.96 g/cm³, more preferably below 0.92 g/cm³, yet more preferably below 0.88 g/cm³.

The polymer of the present material shows elastomeric behaviour as can be seen from its relaxation characteristics after stretching and as is quantified by the following measure of inelasticity. The 'Measure of Inelasticity' refers to a protocol (ASTM D174-90) of stretching the sample to 220%, 150%, and 115%, respectively of its original length, at a cross-head speed of 25 mm/min., holding the sample for 3 minutes at 23° C., then releasing tension and allowing the sample to recover to an equilibrium length. A suitable machine for this set of experiments is a standard universal tensile tester manufactured by Instron Corp., Canton, Mass., model 5564. The results reported for strain are true strain values versus engineering strain values. According to this test method, the material of the present invention preferably recovers after having been stretched to 220% of its original length to less than 120% of its original length, more preferably to less than 115% of its original length, yet more preferably to less than 110% of its original length, yet more preferably to less than 108% of its original length, most preferably to less than 106% of its original length. According to this test method, the material preferably recovers after having been stretched to 150% of its original length to less than 110% of its original length, more preferably to less than 108% of its original length, yet more preferably to less than 106% of its original length, yet more preferably to less than 105% of its original length, most preferably to less than 104% of its original length. According to this test method the material of the present invention preferably recovers after having been stretched to 120% of its original length to less than 108% of its original length, more preferably to less than 106% of its original length, yet more preferably to less than 105% of its original length, yet more preferably to less than 104% of its original length, most preferably to less than 103% of its original length.

The polymeric material of the present invention preferably has a shore A hardness of at least 15, more preferably of at least 25, yet more preferably at least 35. Further, the polymeric material of the present invention has a shore A harness of less than 90, more preferably less than 80, yet more preferably less than 70. It is to be noted, however, that for certain applications a different hardness may be required.

The polymeric material of the present invention is preferably transparent. As used herein, the term "transparent" refers to materials which show only a low level of light dispersion in the visible range and preferably substantially no such dispersion. Because of its transparency, the polymeric material of the present invention may be coloured by adding dyes, oligomeric colouring agents, and the like such as those well known in the art.

The polymeric material of the present invention may be processed on conventional polymer processes such as cast film, injection moulding, blow moulding, melt spunbond, blow film, compression moulding, extruders, gel spinning, and the like.

It is another aspect of the present invention to provide a catalyst combination for polymerising olefins and in particular for polymerising the polymers of the present invention as specified above. The catalyst combination comprises a metallocene catalyst and an activator.

The catalyst of the present invention has the following chemical structure

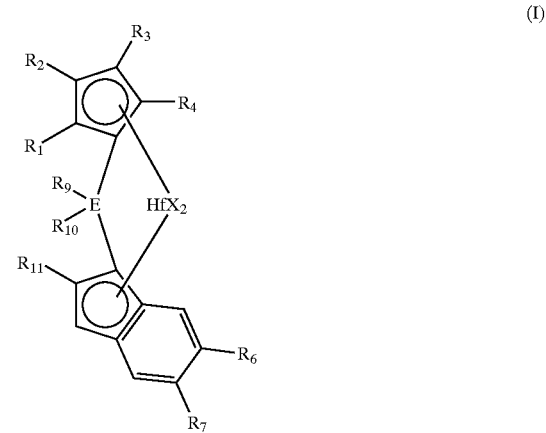

(I)

or preferably

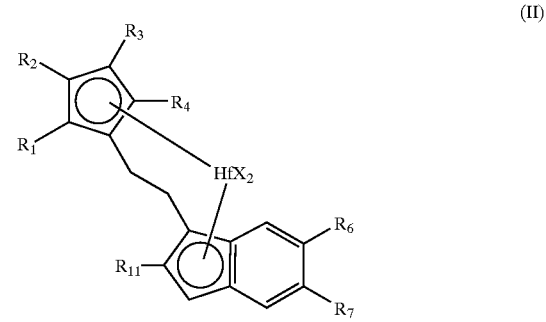

(II)

or more preferably

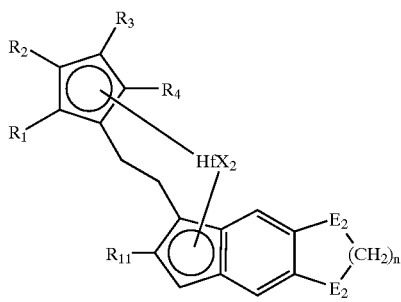
(III)

or yet more preferably

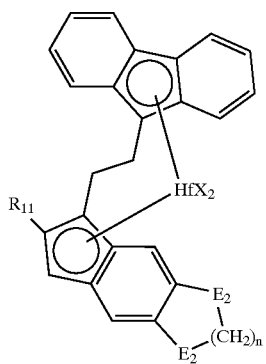
(IV)

or most preferably

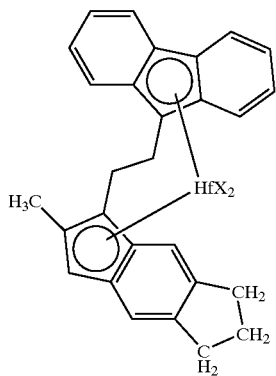
(V)

where
- $R_1$ through $R_7$ refer to linear or branched $C_1$ to $C_{10}$ alkyl, 5- to 7-linked cycloalkyl which in its turn, can carry one ore several $C_1$ to $C_6$ alkyl residues as substituents, $C_6$ to $C_{18}$ arylalkyl or alkylaryl, in which case $R_1/R_2$, $R_3/R_4$, $R_6/R_7$ can be partially or simultaneously integrated into 5- to 7-linked cycloalkyl or aryl rings fused thereto
- $R_9$ and $R_{10}$ refer to H, $C_1$ to $C_8$ alkyl, 4- to 7-linked cycloalkyl, aryl in which case $R_9$, $R_{10}$ can jointly with E form a 4- to 7-linked cycloalkyl
- X refers to $C_1$ to $C_8$ alkyl, aryl, benzyl, preferably alkyl, more preferably methyl
- E refers to carbon, silicon, germanium, or 1,2-ethyl, 1,3-propyl, or 1,4-butyl,
- $E_2$ refers to methyl, oxygen or sulphur, and n is 1 or 2.

The catalyst combination of the present invention also surprisingly has been found to yield the high molecular weight of the polymer of the present invention as well as the other beneficial properties of the polymer, while not compromising the catalyst activity.

Preparation of the catalyst can be carried out in analogy to the catalyst preparation described in WO99/52955, pages 12 through 16, except for the substitution of Zr with Hf.

The catalyst of the present invention may be precipitated on a suitable carrier system such as one of those well known in the art.

It is another aspect of the present invention to provide a process for polymerising the polymer of the present invention.

The polymerisation process of the present invention involves the catalyst of the present invention and an activator according to one of the general formulas $$B(C_6F_5)_3 \qquad (V)$$

$$R_3^9 C[B(C_6F_5)_4] \qquad (VI)$$

$$[R_3^9 NH][B(C_6F_5)_4] \qquad (VII)$$

Herein, $R^9$ signifies a $C_1$–$C_4$ alkyl group or an aryl group. The preferred activator species herein are those of formulae (VI).

Preferably, the catalyst of the present invention and the above activators are employed in such quantities that the atomic ratio between the boron from the activator and hafnium from the catalyst is at least 1:1 and more preferably is less than 100:1, yet more preferably less than 10:1, most preferably less than 2:1.

Preferably, the process of the present invention is carried out at a temperature of at least 0° C., more preferably at least 5° C. Preferably, the process of the present invention is carried at a temperature of less than 50° C., more preferably less than 40° C. The optimum temperature for the process will depend on other factors and may be adjusted accordingly within the above limits.

Preferably, the polymerisation process of the present invention is carried at a pressure of at least 1 bar more preferably at least 3 bars, yet more preferably at least 5 bars. Preferably, the polymerisation process of the present invention is carried out at a pressure of less than 100 bars, more preferably less than 20 bars, yet more preferably less than 15 bars. It is to be noted, however, that the pressure during the reaction of course depends on the reaction temperature.

The polymerisations can be carried out in the gas phase, in suspension, in supercritical monomers and in solvents inert under polymerisation conditions. Suitable inert solvents are such solvents that do not contain any reactive group in the molecule, i.e. aromatic solvents such as benzene, toluene, xylene, ethyl benzene, or alkanes such as propane, pentane, hexane, heptane, mixtures thereof and the like.

Preferably, the polymerization is carried out in supercritical monomers such as propene (bulk polymerization). Also, the polymerization herein is achieved using in-situ activation; under such a process, a stable precursor of the Hafnium-based catalyst herein is used wherein X in the general formula herein is a halogen, preferably chlorine, and said precursor is added together with a alkyl-based reactant (preferably TIBA) and the activator herein, as a pre-mix into the reaction blend.

In the preferred conditions stipulated above, i.e. bulk polymerization and in-situ activation, the use of the Catalyst Combination of the present invention, has allowed a yield from a surprisingly high activity for the catalyst, namely in the range of from 20,000 to 150,000 kg/mol cat/hour, preferably 40,000 to 120,000 kg/mol cat/hour at reaction temperatures under 40° C.

Under the above conditions, the preferred catalyst species of formulae (V) herein, when used in combination with preferred activators of formula (VI) herein) were shown to attain activity values of respectively, 45,000 kg/mol. Cat/hour at 10° C., yielding a polymer of a molecular weight of 2000 kg/mole, and of 100,000 kg/mol.cat/hour at 30° C., yielding a polymer of a molecular weight of 750 kg/mole.

It is another aspect of the present invention to provide bodies, films, fibers, web materials, coatings, foams, adhesives, and the like comprising the polymer of the present invention.

The present invention provides an article comprising a first element and a second element separated from and joined to said first element, said first element being a body of polymeric material. The present invention further provides a method for manufacturing a body from polymeric material comprising a step of processing said polymeric material selected from the group of injection moulding, extrusion blow moulding, extrusion, casting, solution sedimentation, and combinations thereof. The present invention further provides a method for processing a body of polymeric material comprising a step selected from the group of thermoforming, laser forming, carving, and combinations thereof.

A wide variety of suitable methods to manufacture and/or to further process bodies from the polymer of the present invention are known in the art including but not being limited to injection moulding, extrusion blow moulding, extrusion, casting, solution sedimentation, thermoforming, laser forming, carving, combinations thereof, and the like.

The body of the present invention has been found to exhibit a relative low tackiness at room temperature due to the high molecular weight of the polymer.

Various additives may be added to the homopolymer of the present invention to change the properties of the polymer such as is well known in the art.

For at least some of the manufacturing techniques and in particular for the moulding processes, it may useful to add to the homopolymer having a low isotacticity a homopolymer having a high isotacticity such as those conventionally known isotactic polypropylenes. Preferably, the isotactic homopolymer is added at a level of at least 20% of the total weight of the polymeric body, more preferably at a level of at least 40%, yet more preferably at a level of at least 50%, most preferably at a level of at least 60%. Preferably, the low isotacticity homopolymer of the present invention is present in the polymeric body of the present invention at a level of at least 20%, more preferably at least 30%, yet more preferably at least 40%, most preferably at least 50% by total weight of the polymeric body. Preferably, the shrinkage of the moulded is less than 10%, more preferably less than 8%, yet more preferably less than 6%, most preferably less than 4%. Compared to processing substantially pure polypropylene, the blending with the homopolymer of the present invention when making the body of the present invention allows processes such as extrusion to be performed at higher speeds since the required forces, pressure, or torques respectively are lowered.

The second element of the article of the present invention can preferably be made from the same homopolymer as the first element, either having the same low isotacticity or a different isotacticity depending on the intended use of the second element. The configuration of the polymeric material of the second element can also be a body or it could be a foam, a fibre, a film, or the like. Making articles from different grades of the same material is beneficial when recycling material from a disposed article. If the same homopolymer is used for the different elements of the article, no separation step into the various materials is necessary before recycling of the material.

It may be useful to blend additives into the homopolymer of the present invention. A broad variety of such additives is known in the art and can be used accordingly. For example, small amounts of a thermal stabilizer, such as 0.1%–0.25% of a phenol/phosphite blend, can be mixed into the homopolymer of the present invention to increase the thermal stability of the polymer during processing.

The article according to the present invention may be a hygienic article. The term "hygienic article" as used herein refers to articles which are intended to be used in contact with or in proximity to the body of a living being. Such hygienic articles may be disposable or intended for multiple or prolonged use. Such hygienic articles include but are not limited to catheters, tubing, drainage systems, syringes, grafts, prosthetics, body implants, instrumentation, support means, toothbrushes, bed covers, stents, gaskets, pump diaphragms, baby bottle nipples, pacifiers, and the like. With regard to the specific advantages of the polymers used for the articles of the present invention, it will be readily apparent to the skilled practitioner to apply the bodies of polymeric material according to the present invention in the above and similar hygienic articles.

The article according to the present invention may be a household article. The term "household article" as used herein refers to articles intended to be used when running a household. The household articles of the present invention include but are not limited to garbage bins, storage containers, hoses, toys, kitchenware, clothing and in particular heavy duty clothing up to bullet proof clothing, shoes and in particular shoe soles, scuba fins and the like, furniture in particular garden furniture, sporting goods, bellows, and the like. With regard to the specific advantages of the polymers used for the articles of the present invention, it will be readily apparent to the skilled practitioner to apply the bodies of polymeric material according to the present invention in the above and similar household articles.

The article according to the present invention may further be an automotive part including but not being limited to bumper fascia, air dams, side mouldings, fender flares, grills, body panels, ducts, tires, vibration dampers, flexible joints, window seals, interior parts, door gaskets, automotive boots, and the like. With regard to the specific advantages of the polymers used for the articles of the present invention, it will be readily apparent to the skilled practitioner to apply and to optionally modify the bodies of polymeric material according to the present invention in the above and similar automotive parts.

The body of polymeric material according to the present invention may also be used as a construction element in an article. Thereby, the functionalities of the body of polymeric material includes but is not limited to supporting, carrying, fixing, protecting other elements of the article and the like. Such articles include but are not limited to cover parts, complex constructions such as buildings (weather stripping, expansion joints, door gaskets and seals, water gaskets, window seals, hoses, ducts, tubes, wire and cable insulation, floor coverings, and the like), cars, household appliances, horticultural and agricultural constructions, and the like. With regard to the specific advantages of the polymers used for the articles of the present invention, it will be readily apparent to the skilled practitioner to apply and to optionally modify the bodies of polymeric material according to the present invention as construction elements in the above and similar articles.

The present invention provides an article comprising a first element and a second element joined to the first element, the first element comprising a film web material. The present invention further provides a method for manufacturing a film web material comprising a step of processing the aforementioned polymeric material, the step of processing selected from the group of casting, extruding, blowing, and combinations thereof. The present invention further provides a method for processing a film web material comprising the aforementioned polymer, the process comprising a step selected from the group of orienting, bi-axially stretching, crazing, stretching, shrinking, and combinations thereof.

Various additives may be added to the homopolymer of the present invention to change the properties of the polymer such as is well known in the art. For example, blending the polymer with between 2% and 6% by weight of talc and optionally with between 0.1% and 0.25% by weight of phenol/phosphite stabilizer, the processability of the film material of the present invention can be greatly enhanced.

Compared to processing of conventional, isotactic polypropylene, the addition of the low isotacticity homopolymer of the present invention reduces the required forces, pressures, or torques respectively to process the polymer.

In the prior art, a wide variety of suitable techniques to manufacture film web materials are known including but not being limited to casting, extruding, blowing, and combinations thereof. In addition, a wide variety of techniques for further processing of film web materials is known in the art including but not being limited to orienting, bi-axially stretching, crazing, stretching, shrinking, and combinations thereof. The aforementioned methods for manufacturing and processing film web materials all have specific advantages which are known to the skilled person. Hence, the skilled person will be able to select a suitable method for manufacturing and processing the film web material of the present invention depending on the specific requirement of the respective application of the film web material.

In order to reduce shrinkage in the transverse direction, it may be useful to place air jets at the die exit to add additional cooling.

When storing the film of the present invention on a take-up roll, the use of a release paper may improve the downstream handling of the film.

In order to render the film of the present invention breathable, the polymer may be mixed with a particulate filler material such as calcium carbonate prior to manufacturing the film and be stretched subsequent to manufacturing the film in order to create micro pores at the location of the included filler material by stretching the film material. Preferably, the breathable film material of the present invention has a moisture vapour transmission rate (MVTR) of at least 1000 g per 24 hours per square meter (g/24 h/m$^2$), more preferably at least 2000 g/24 h/m$^2$, yet more preferably at least 3000 g/24 h/m$^2$, most preferably at least 4000 g/24 h/m$^2$. The method of determining MVTR is well known in the art and should be applied accordingly.

The film web material according to the present invention may also be used as a construction element in an article. Thereby, the functionalities of the film web material includes but is not limited to supporting, carrying, fixing, protecting other elements of the article and the like. Such articles include but are not limited to adhesive tapes, video/audio/data storage tapes, cables, and complex constructions such as buildings (floor coverings, house wraps, and the like), cars, household appliances, horticultural and agricultural constructions, and the like. With regard to the specific advantages of the polymers used for the articles of the present invention, it will be readily apparent to the skilled practitioner to apply and to optionally modify the film web materials according to the present invention as construction elements in the above and similar articles.

The articles of the present invention may also be packaging articles such as produce bags, trash bags, ice bags, shipping sacks, containers, pouches, and the like. The term "packaging article" as used herein refers to articles which are intended to at least partially envelope other articles. The first element of such an article is a specifically contoured piece of the film web material and the second element may form a seal as a thermobond seal of the film web material onto itself.

The article of the present invention may also be a package article where the first element of the article is the wrap material used for packaging the second element.

The present invention provides a fibrous web material comprising a plurality of fibres of the polymer of the present invention. The present invention further provides a method for manufacturing fibres from the aforementioned polymeric material comprising a step of processing the polymeric material selected from the group of wet spinning, dry spinning, melt spinning, semi dry spinning (solvent evaporation or sedimentation), and combinations thereof. The present invention further provides a method for manufacturing a fibrous web material comprising the steps of providing fibres of the aforementioned polymeric material and of combining the fibres into a web material. The present invention further provides a method for stabilizing a fibrous web material according to the present invention comprising the steps of providing a fibrous web material and of stabilizing the fibrous web material.

Various additives may be added to the homopolymer of the present invention to change the properties of the polymer such as is well known in the art.

A wide variety of suitable methods to manufacture and/or process fibres from the polymer of the present invention are known in the art, including but not being limited to wet spinning, dry spinning, melt spinning, semi dry spinning (solvent evaporation or sedimentation), crazing, and combinations thereof. Fibres suitable for the web materials of the present invention may be mono fibres or they may comprise filaments.

It is a further aspect of the present invention to provide an article comprising a fibrous web material according to the present invention. The article according to the present invention may be a hygienic article.

The article of the present invention may also be a clothing article or a household article including but not being limited to bed covers, underwear, tights, socks, gloves, sport clothing, outdoor clothing, low temperature clothing, shoes and shoe covers, protective clothing such as for motor biking, blankets, covers, bags, items of furniture, and the like. With regard to the specific advantages of the polymers used for the articles of the present invention, it will be readily apparent to the skilled practitioner to apply and to optionally modify the fibrous web materials according to the present invention in the above and similar articles.

The fibrous web material according to the present invention may also be used as a construction element in an article. Thereby, the functionalities of the fibrous web material includes but is not limited to supporting, carrying, fixing, protecting other elements of the article and the like. Such articles include but are not limited to adhesive tapes, protective wraps, complex constructions such as buildings (floor coverings, house wraps, and the like), cars, household appliances, horticultural and agricultural constructions (geotextiles), and the like. With regard to the specific advantages of the polymers used for the articles of the present invention, it will be readily apparent to the skilled practitioner to apply and to optionally modify the fibrous web materials according to the present invention as construction elements in the above and similar articles.

The article of the present invention may further be membranes such as those in filters, car batteries, and the like. With regard to the specific advantages of the polymers used for the articles of the present invention, it will be readily apparent to the skilled practitioner to apply and to optionally modify the fibrous web materials according to the present invention in the above and similar articles.

The present invention provides a coating composition for covering at least a portion of the surface of an element with a polymeric coating according to the present invention. The present invention further provides an article comprising an element and the aforementioned polymeric coating material covering at least portion of the surface of said element. The present invention further provides a method for coating an element with the aforementioned polymeric coating material comprising a step selected from the group of dip coating, spray coating, emulsion coating, and combinations thereof.

It has been found that the coating of the present invention can be applied at relatively low basis weights. Preferably, the basis weight of the coating of the present invention is less than 50 grams per square meter ($g/m^2$), more preferably less than 40 $g/m^2$, yet more preferably less than 30 $g/m^2$, yet more preferably less than 20 $g/m^2$, most preferably less than 10 $g/m^2$.

It is a further aspect of the present invention to provide an article comprising an element, at least a portion of the surface the element being covered with the coating material according to the present invention.

In the prior an, a wide variety of suitable techniques to manufacture coating articles are known including but not being limited to dip coating, spray coating, emulsion coating, and combinations thereof. The coating of the present invention is not limited to a specific substrate as long as the polymer of the coating is capable of sufficiently adhering to the substrate material. Suitable substrates include but are not limited to bodies of various material such as metal, polymer, wood, and the like, woven and nonwoven web materials, films, and the like. The aforementioned methods for manufacturing coating articles all have specific advantages which are known to the skilled person. Hence, the skilled person will be able to select a suitable method for manufacturing the coating material of the present invention depending on the specific requirement of the respective application of the coating material.

In order to render the coating of the present invention breathable, the polymer may be mixed with a particulate filler material such as calcium carbonate prior to manufacturing the coating and be stretched subsequently (before or after contacting the substrate) in order to create micro pores at the location of the included filler material by stretching the coating material. Preferably, the breathable film material of the present invention has a moisture vapour transmission rate (MVTR) of at least 1000 g per 24 hours per square meter ($g/24\ h/m^2$), more preferably at least 2000 g/24 h/2, yet more preferably at least 3000 g/24 h/m2, most preferably at least 4000 $g/24\ h/m^2$. The method of determining MVTR is well known in the art and should be applied accordingly.

The coated article of the present invention could be a hygienic article. The coating material according to the present invention may also be used as a construction element in an article. Thereby, the functionalities of the coating material includes but is not limited to heat insulation, electric insulation, shock absorption, cushioning, acoustic wave damping, protecting other elements of the article, corrosion protection, allowance for relative movement of other elements, slip reduction, and the like. Such articles include but are not limited to toys, furniture, clothing, shoes, sport equipment, grips, complex constructions such as buildings (floor coverings, caulking, sealants, ridge/crack filler, and the like), cars, household appliances, and the like. With regard to the specific advantages of the polymers used for the articles of the present invention, it will be readily apparent to the skilled practitioner to apply and to optionally modify the coating materials according to the present invention as construction elements in the above and similar articles.

The present invention provides a polymeric foam material. The foam material comprises the polymer of the present invention. The present invention further provides a method for manufacturing the polymeric foam material of the present invention comprising a step of processing the polymeric material, said step of processing selected from the group of inert gas expansion, evaporated solvent expansion, reactive reagent gas expansion, high internal phase emulsion, bead expansion, and combinations thereof.

In the prior art, a wide variety of suitable techniques to manufacture foam materials are known including but not being limited to inert gas expansion, evaporated solvent expansion, reactive reagent gas expansion, high internal phase emulsion, bead expansion, and combinations thereof. The aforementioned methods for manufacturing foam materials all have specific advantages which are known to the skilled person. Hence, the skilled person will be able to select a suitable method for manufacturing the foam material of the present invention depending on the specific requirement of the respective application of the foam material. Suitable gases or evaporated solvents for expanding the foams of the present invention include but are not limited to $CO_2$, $N_2$, propene, pentane, and the like. It has been found that due to the low tacticity of the polymer, the processability of the polymer during manufacture of the foam has been greatly improved.

The foam material according to the present invention may also be used as a construction element in an article. Thereby, the functionalities of the foam material include but are not limited to heat insulation, electric insulation, shock absorption, cushioning, acoustic wave damping, protecting other elements of the article, sealing, packaging, storing, providing buoyancy, and the like. Such articles include but are not limited to toys, furniture, mattresses, carpets, clothing, shoes, sport equipment, complex constructions such as buildings (floor coverings, house wraps, and the like), cars, household appliances, and the like. With regard to the specific advantages of the polymers used for the articles of the present invention, it will be readily apparent to the skilled practitioner to apply and to optionally modify the foam materials according to the present invention as construction elements in the above and similar articles. It is particularly preferred to combine the foam material with a conventional polypropylene material to form the article. In this case, recycling of the material does not require separation of the different materials.

The foam material of the present invention may be oil absorbent and may be rendered water absorbent by suitable surface energy modifiers. Suitable surface energy modifiers are well known in the art. In case the foam material of the present invention is absorbent, the foam material may used in instances including but not limited to oil absorption, solvent absorption, spill absorption, liquid distribution, liquid transportation, and the like. To improve the absorbency of the foam of the present invention, various additives such as those known in the art may be added to the external and internal surfaces of the foam of the present invention. The foam material of the present invention may further be used to deliver absorbed liquids such as for example adhesive, shoe polish, ink, lubricants and the like upon compression of the foam material.

What is claimed is:

1. A polymeric material comprising substantially linear polyolefin molecules comprising $C_3$–$C_{20}$ monomers, said linear polyolefin molecules being characterized by a total pentad area and characterized in that the relative content of [mmmm] of said polyolefin is between 10% and 60% of said total pentad area, the weight average molecular weight of said linear polyolefin molecules is at least 1000 kg/mol, and said polymeric material has a ratio k of at least 0.05;

wherein k is defined as $$k = \frac{[mrrm] - [m]^2(1-[m])^2}{[m](1-[m]) - [m]^2(1-[m])^2}$$

and further wherein the relative content of [mmmm] of said linear polyolefin is between 2.5% and 7% of said total pentad area.

2. A polymeric material according to claim 1 wherein said polymeric material is a polyolefin ic stereohomopolymer.

3. A polymeric material according to claim 1 wherein said monomer is propene.

* * * * *

UNITED STATES PATENT AND TRADEMARK OFFICE
CERTIFICATE OF CORRECTION

PATENT NO. : 6,878,790 B2
DATED : April 12, 2005
INVENTOR(S) : Preuschen et al.

It is certified that error appears in the above-identified patent and that said Letters Patent is hereby corrected as shown below:

Column 13,
Line 39, delete "an" and insert therefor -- art --.
Line 64, delete "g/24 h/2" and insert therefor -- $g/24\ h/m^2$ --.
Line 65, delete "g/24 h/m2" and insert therefor -- $g/24\ h/m^2$ --.

Column 16,
Line 11, delete "[mmmm]" and insert therefor -- [rmrm] --.
Line 15, delete "polyolefin ic" and insert therefor -- polyolefinic --.

Signed and Sealed this

Fifth Day of July, 2005

JON W. DUDAS
*Director of the United States Patent and Trademark Office*